United States Patent
Garware (10) Patent No.: US 11,805,759 B2
(45) Date of Patent: Nov. 7, 2023

(54) FEEDING SYSTEM FOR POULTRY

(71) Applicant: GARTECH EQUIPMENTS PVT. LTD., Maharashtra (IN)

(72) Inventor: Harish Rajaram Garware, Maharashtra (IN)

(73) Assignee: GARTECH EQUIPMENTS PVT. LTD., Pune (IN)

( * ) Notice: Subject to any disclaimer, the term of this patent is extended or adjusted under 35 U.S.C. 154(b) by 13 days.

(21) Appl. No.: 17/265,715

(22) PCT Filed: Oct. 3, 2019

(86) PCT No.: PCT/IB2019/058420
§ 371 (c)(1),
(2) Date: Feb. 3, 2021

(87) PCT Pub. No.: WO2020/070685
PCT Pub. Date: Apr. 9, 2020

(65) Prior Publication Data
US 2021/0307299 A1 Oct. 7, 2021

(30) Foreign Application Priority Data
Oct. 4, 2018 (IN) .............................. 201821037601

(51) Int. Cl.
*A01K 39/012* (2006.01)
(52) U.S. Cl.
CPC ................ *A01K 39/0125* (2013.01)
(58) Field of Classification Search
USPC .... 119/52.1, 51.01, 70, 52.3, 53, 52.2, 52.4, 119/56.1, 56.2, 57, 57.1, 57.2, 57.4,
(Continued)

(56) References Cited

U.S. PATENT DOCUMENTS 2,800,106 A * 7/1957 Nelson ............... A01K 39/0125
198/531
3,191,581 A * 6/1965 Braham ................. A01K 39/01
119/57.2

(Continued)

FOREIGN PATENT DOCUMENTS

| CN | 102972311 | * | 3/2013 | |
|---|---|---|---|---|
| DE | 20 2016 106 300 U1 | | 2/2018 | |
| EP | 0105571 A2 | * | 4/1984 | ........... A01K 39/012 |

OTHER PUBLICATIONS

International Search Report of PCT/IB2019/058420, dated Jan. 10, 2020.

*Primary Examiner* — Andrea M Valenti
(74) *Attorney, Agent, or Firm* — Collard & Roe, P.C.

(57) ABSTRACT

The present disclosure envisages a feeding system for poultry. The system includes a plurality of first and second pan assemblies that are attached to a conveyor. The conveyor is driven by a main drive unit consisting of combination of prime mover/s and push belt drive to facilitate simultaneous movement of the pan assemblies. An IFH-station is provided for supplying ration to the pan assemblies. The difference in physical characteristic of male and female birds is considered while designing the first and second pan assemblies to deter the male and female birds to access ration from each other's pan assemblies. The system helps in proper ration quantity to male and female birds to enhance their economic value.

13 Claims, 11 Drawing Sheets

(58) Field of Classification Search
USPC ............................................ 119/57.92, 57.7
See application file for complete search history.

(56) References Cited

U.S. PATENT DOCUMENTS

| | | | | |
|---|---|---|---|---|
| 3,693,593 | A * | 9/1972 | Ackermann | ......... A01K 5/0266 |
| | | | | 119/57.4 |
| 3,719,170 | A * | 3/1973 | Peterson | ................ A01K 39/01 |
| | | | | 119/57.2 |
| 4,241,700 | A * | 12/1980 | Cobb | ..................... A01K 39/01 |
| | | | | 119/57.4 |
| 4,623,056 | A * | 11/1986 | Flaugher | ................ B29B 7/603 |
| | | | | 193/23 |
| 5,794,562 | A * | 8/1998 | Hart | ................... A01K 39/0125 |
| | | | | 119/57.4 |
| 5,884,581 | A * | 3/1999 | Vandaele | ........... A01K 39/0125 |
| | | | | 119/57.4 |
| 6,314,909 | B1 * | 11/2001 | Horwood | ............... A01K 29/00 |
| | | | | 119/51.02 |
| 2017/0245475 | A1 * | 8/2017 | Dhumal | ............. A01K 39/0125 |
| 2018/0263221 | A1 * | 9/2018 | Mark | ................. A01K 39/0113 |
| 2019/0364845 | A1 | 12/2019 | Wienken | |

* cited by examiner

FEEDING SYSTEM FOR POULTRY

CROSS REFERENCE TO RELATED APPLICATIONS

This application is the National Stage of PCT/IB2019/058420 filed on Oct. 3, 2019, which claims priority under 35 U.S.C. § 119 of Indian Application No. 201821037601, filed on Oct. 4, 2018, the disclosure of which is incorporated by reference.

FIELD

The present disclosure relates to the field of feeding systems for poultry.

Definitions

As used in the present disclosure, the following terms are generally intended to have the meaning as set forth below, except to the extent that the context in which they are used indicate otherwise.

Intelligent Feed Hopper (IFH)—The term "Intelligent Feed Hopper" hereinafter refers to at least one hopper used for supplying feed into pan assemblies of birds. Each of the IFH is capable of controlling the amount of feed being fed into each of the pan assemblies.

Intelligent Feed Hopper station (IFH-station)—The term "Intelligent Feed Hopper station" hereinafter refers to a location on a bird rearing floor where the feed for the birds/poultry is being fed into respective pan assemblies. The IFH-station comprises at least one IFH. The pan assemblies are moved through the IFH-station for re-filling purpose.

BACKGROUND

The background information herein below relates to the present disclosure but is not necessarily prior art.

Various feeding systems are known in the art, which are used to feed poultry. In a conventional conveyor type feeding system, a conveyor is placed in a feeding trough and the feed from a stationary hopper is circulated in the conveyor. The commonly used conveyors are drag chain, flat chain, rope with disc or auger. These conveyor type feeding systems are used in both cage batteries and floor rearing of birds. In a rotating auger/screw/spiral conveyor, a spiral type feeder is fitted in a pipe with openings at regular intervals. Feed pans are mounted on the pipe at the openings. The auger rotates or moves forward like chain conveyors as and when the feed is required in the pans. A trolley type feeding system is used for birds reared in cages. Normally rails are mounted on cage frames and a trolley with hoppers travel along the cage length to distribute the feed in the feed troughs fixed in front of the cages. Normally it is pulled by a horizontal motorized rope loop. The hopper openings open up in a smaller receiver which acts as a leveler. This feed receiver is independent of the hopper and rests in the feed trough. The receiver is dragged along the hopper while travelling from one end of the cage to another end. However, the aforementioned conventional systems cannot quantify or measure the feed dispensed in the pan or feed trough accurately and fails to dispense the feed equivalent to each bird's requirement. In the conventional feeding systems, every individual bird does not get a totally secluded space for feeding which is non-accessible by neighboring birds in the vicinity. The area of feeding space provided by the conventional systems cannot be adjusted and readjusted as per the varying number of birds in the house accurately.

Therefore, there is felt a need of a feeding system for poultry that alleviates the aforementioned drawbacks.

Objects

Some of the objects of the present disclosure, which at least one embodiment herein satisfies, are as follows:

An object of the present disclosure is to provide a feeding system for poultry.

Another object of the present disclosure is to provide a feeding system that facilitates controlled food distribution in each and every pan assembly in terms of feed quantum per secluded feed slot and number of such secluded slots. Based on the age, performance and number of birds available in the poultry house after deducting daily mortality, the quantity of feed per male and female bird including total number of required slots and its location is redefined and feed is dispensed accordingly.

Yet another object of the present disclosure is to provide male and/or first pan assemblies on the same circuit of feeding system with possibility of accurately filling separate feed formulation in respective pan assemblies for male or female birds.

Yet another object of the present disclosure is to provide male and/or first pan assemblies on the same circuit of feeding system at desired location like either at equal distance or separately on either side of the circuit or even only female and/or second pan assemblies on the same circuit.

Yet another object of the present disclosure is to provide a feeding system that facilitates precise food distribution.

Yet another object of the present disclosure is to provide a feeding system that prevents overfeeding.

Yet another object of the present disclosure is to provide a feeding system that prevents mixing of food of a male bird and a female bird.

Other objects and advantages of the present disclosure will be more apparent from the following description, which is not intended to limit the scope of the present disclosure.

SUMMARY

The present disclosure envisages a feeding system for poultry. The feeding system comprises a conveyor that routed along a floor, a plurality of first pan assemblies and a plurality of second pan assemblies that are removably secured to the conveyor, a drive arrangement for driving the conveyor, a refilling station (IFH-station).

The second pan assemblies are configured operatively higher than the first pan assemblies. The conveyor moves the pan assemblies simultaneously through the IFH-station.

In an embodiment, an Intelligent Feed Hopper station (IFH-station) is configured to fill the pan assemblies as each of the pan assemblies moves through the IFH-station.

In an embodiment, provision of anti spillage cum neck-comfort ring to each first (male) pan.

In another embodiment, the drive arrangement includes at least one drive motor that is coupled to the conveyor. The drive motor is configured to power the conveyor.

In yet another embodiment, the first pan assemblies are configured to feed male birds while second pan assemblies are configured to feed female birds.

In an embodiment, to control the feed window size, an adjustable grill and ring structure is provided to each second (female) pan for discouraging male bird from accessing feed from the female pan.

In an embodiment, a grill structure is provided with anti spillage cum neck-comfort ring to each second (female) pan.

In an embodiment, the IFH-station comprises a first IFH configured to supply feed into each of the first pan assemblies and a second IFH configured to supply feed into each of the second pan assemblies.

In an embodiment, a first anti spillage cum neck-comfort ring is provided in each of the first pan assemblies to avoid feed spillage by bird during eating.

In an embodiment, a second anti spillage cum neck-comfort ring is provided in each of the second pan assemblies to avoid feed spillage by bird during eating.

In an embodiment, the first and second anti spillage cum neck-comfort rings avoid feed spillage during refilling of the pan assemblies at the IFH-station.

BRIEF DESCRIPTION OF THE ACCOMPANYING DRAWING

A feeding system, of the present disclosure, will now be described with the help of the accompanying drawing, in which.

LIST OF REFERENCE NUMERALS

105—Main drive unit consisting of combination of prime mover/s and push belt drive (hereafter also referred as "main drive unit 105")
110—Conveyor
111a—First feeding circuit
111b—Second feeding circuit
111c—Third feeding circuit
111d—Fourth feeding circuit
140—First pan assembly
141—First anti spillage cum neck-comfort ring
142—First secluded feeding chambers/slots
145—First connecting feature
147—Walls for first pan assemblies
146—First feeding pan
149—First bottom ring
150—Second pan assembly
151—Second anti spillage cum neck-comfort ring
152—Second secluded feeding chambers/slots
155—Second connecting feature
157—Walls for second pan assemblies
158—Throat piece
159—Second bottom ring
160—Height adjustment ring
163—Grill structure
240—Intelligent Feed Hopper station (IFH-station)
240a—First IFH
240b—Second IFH

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an" and "the" may be intended to include the plural forms as well, unless the context clearly suggests otherwise. The terms "comprises", "comprising", "including" and "having" are open-ended transitional phrases and therefore specify the presence of stated features, integers, operations, elements, units and/or components, but do not forbid the presence or addition of one or more other features, integers, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "mounted on", "engaged to", "connected to", "attached to", or "coupled to" another element, it may be directly on, engaged, connected or coupled to the other element. As used herein, the term "and/or" includes any and all combinations of one or more of the associated listed elements.

The terms first, second, third, etc., should not be construed to limit the scope of the present disclosure as the aforementioned terms may be only used to distinguish one element, component, region, or section from another component, region, or section. Terms such as first, second, third etc., when used herein do not imply a specific sequence or order unless clearly suggested by the present disclosure.

Terms such as "inner", "outer", "beneath", "below", "lower", "above", "upper" and the like, may be used in the present disclosure to describe relationships between different elements as depicted from the figures.

Breeding stock or commonly known as broiler parents are genetically engineered to produce very high meat yielding birds. Hence, genetically, they have a tendency to put on weight faster than their contemporaries. A healthy & vigorous parent (males and females) can only produce optimum quality and quantity of chicks/hatching eggs. To ensure this, it is very important to control the body weight of the parent stocks. To achieve this, every male and female has to be separately given a specially formulated rationed/controlled feed as per the bird's sex, age and performance. The number of broiler parents housed in one building for birds reared on floor system can be around 15000 and on single premises and there can be multiple such buildings at one site. In a poultry industry, it is a common practice to theoretically calculate the required daily feed for males and females of each building and try to distribute the same separately throughout the building assuming that all birds will eat equally. This method is practiced for birds raised either on floor or in cage batteries. The feeding is done manually or is mechanized using any one of the conventional feeding systems explained in previous paragraphs. On floor type rearing, it is difficult to observe and recognize the problems associated to unequal feeding as birds are freely moving on the floor. The birds have easy access to feed of a neighboring bird. The stronger bird can easily eat feed rationed for other birds. Total quantity of feed is distributed throughout building assuming that each pan or linear feed trough is filled equally. All birds in the vicinity have access to the feed in pan or feed trough, and hence, there is absolutely no control on the quantity of feed each bird is eating. The total feeding space is calculated and provided as per full house capacity. But over a period, there is certain depletion and it is not possible in the linear feed distribution system to reduce the feeding space accordingly. In conventional pan type system, it is also not practical to exactly reduce the feeding space on daily basis, and hence, the feeding space is not proportionate to number of birds. Hence, it is not possible to have equal feed distribution bird wise and, in the end, there is unequal growth and variation in productivity. Conventional feeding systems for floor feeding of broiler breeders are inadequate and have limitation in offering equal feed to birds.

The present disclosure envisages additional embodiments of the feeding system disclosed in Indian patent application number 201821037601 filed on Oct. 4, 2018.

One of the additional embodiments of the feeding system, of the present disclosure, is now described with reference to FIG. 1 through FIG. 11.

Figure 1:
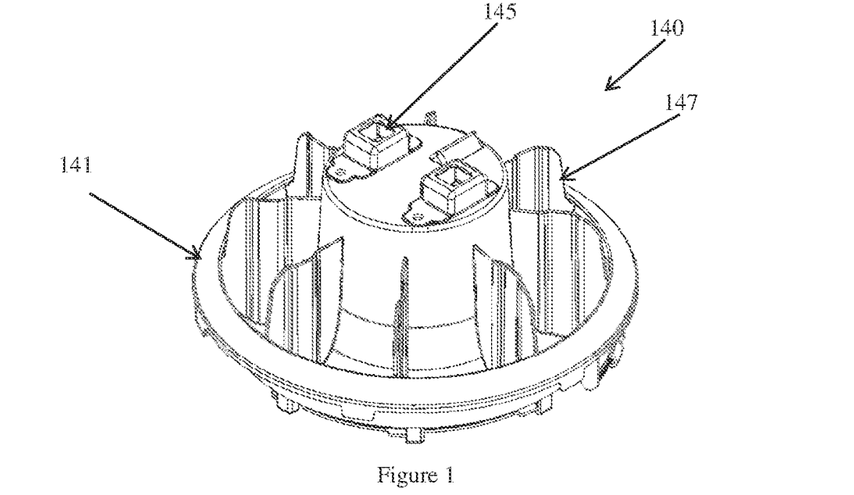
FIG. 1 illustrates an isometric view of first a pan assembly of the feeding system, in accordance with an embodiment of the present disclosure.
Figure 2:
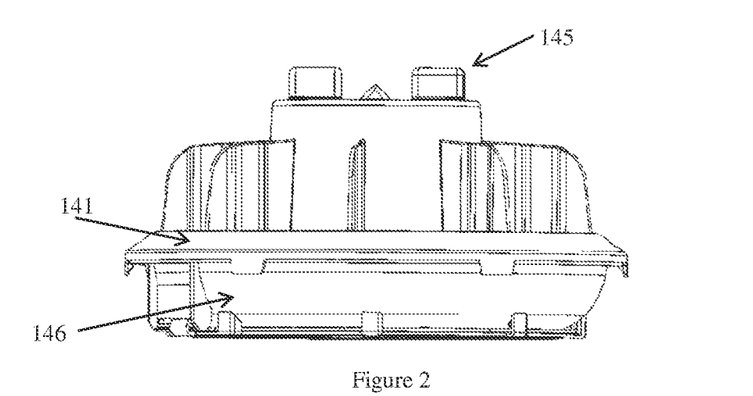
FIG. 2 shows a front view of the first pan assembly of FIG. 1.
Figure 3A:
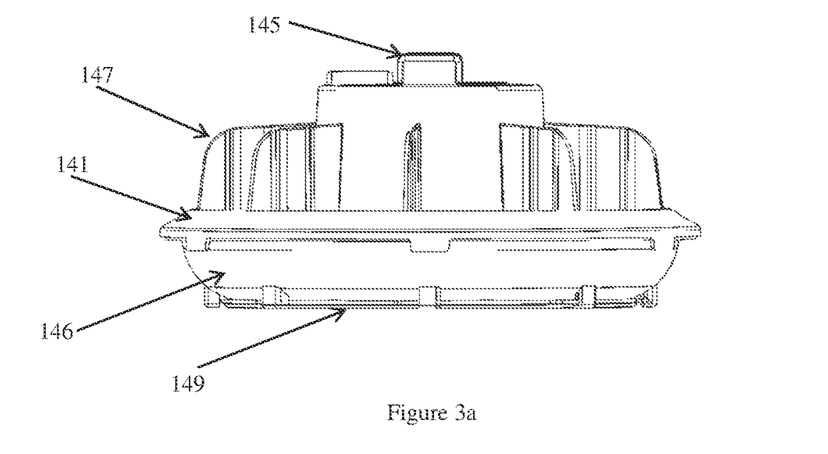
FIG. 3a shows a side view of the first pan assembly of FIG. 2.
Figure 3B:
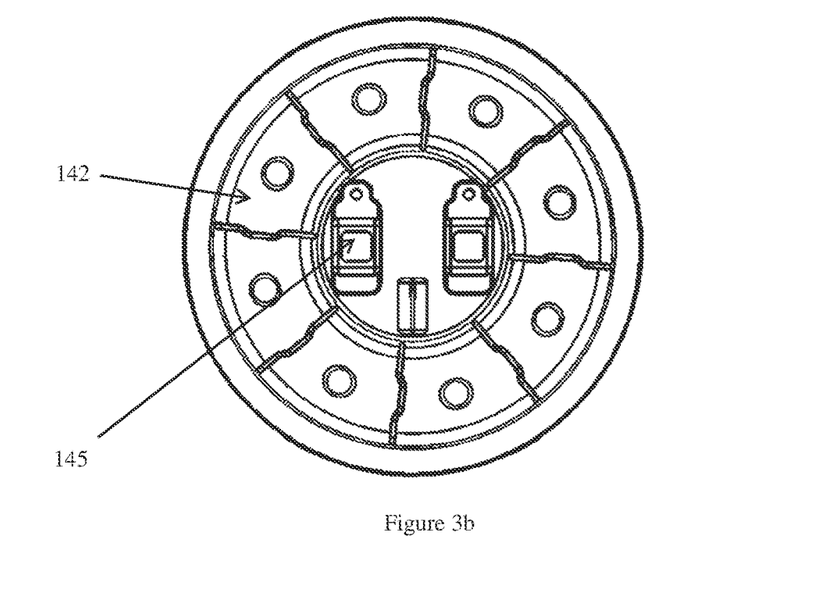
FIGS. 3b and 3c show a top view and a bottom view of the first pan assembly of FIG. 2.
Figure 3C:
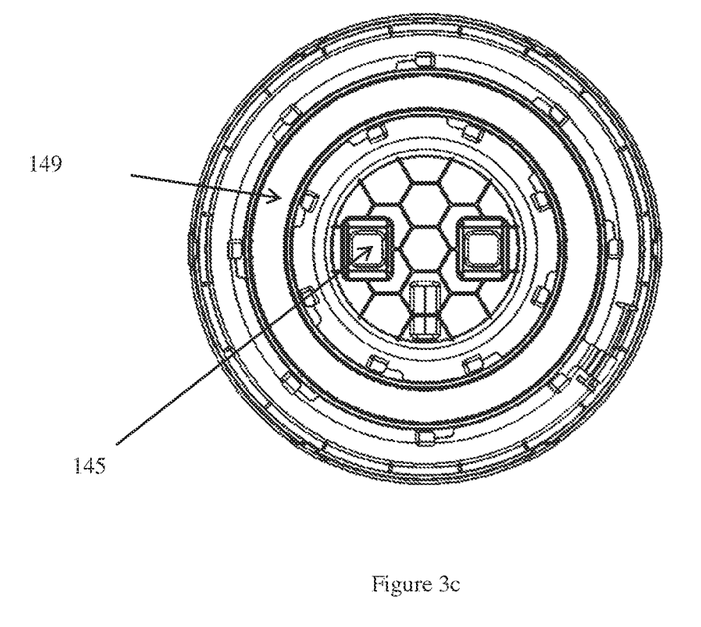

In accordance with the additional embodiment, a first pan assembly 140 is shown in FIG. 1 through FIG. 3. The feeding system includes a plurality of such first pan assemblies 140 attached to a conveyor 110. A main drive unit consisting of combination of prime mover/s and push belt drive 105 (hereafter also referred as "main drive unit 105") is provided for moving the conveyor 110. At least one drive motor is provided for driving the conveyor 110. The conveyor 110 helps the simultaneous movement of the pan assemblies that are attached to the conveyor.

The first pan assemblies 140 shown in FIG. 1 are configured to provide feed for male birds. The first pan assemblies 140 comprises a first anti spillage cum neck-comfort ring 141, a first feeding pan 146, a plurality of first feeding chambers/slots 142, a plurality of walls 147 of the first pan assemblies 150, and a first connecting feature 145. The first feeding pan 146 is divided into a plurality of first feeding chambers/slots 142 by the plurality of walls 147 of the first pan assemblies 150. The first anti spillage cum neck-comfort ring 141 is provided with curved and smooth edges to protect the necks of male birds while feeding. Each of the first feeding chambers/slots 142 facilitates a single male bird to access the feed area at a time. Each pan of the first pan assemblies 140 is attached to the conveyor 110 via the first connecting feature 145. A plurality of hooks (no seen in figures) is used to attach the first pan assemblies 140 to the conveyor 110.

In an embodiment, a plurality of second pan assemblies 150 is attached to the conveyor 110 for providing ration for female birds. A second connecting feature 155 is configured on each of the second pan assemblies 150. Each pan of the second pan assemblies 150 is attached to the conveyor 110 via the second connecting feature 155. A plurality of hooks (no seen in figures) is used to attach each pan of the first pan assemblies 150 to the conveyor 110.

An IFH-station 240 is provided on the floor for refilling ration/feed into each of the first 140 and second pan assemblies 150 as each of the pan assembly move through the IFH-station 240. The IFH-station 240 includes a first IFH 240a and a second IFH 240b. The first IFH 240a is configured to supply ration into the first pan assemblies 140, while the second IFH 240b is configured to supply ration to the second pan assemblies 150. In an embodiment, the first IFH 240a supplies ration for male birds and the second IFH 240b supplies ration for female birds.

The first feeding pan 146 is configured to receive feed from a first IFH 240a and store the feed therein. The first feeding pan 146 has a circular profile. The first feeding pan assembly 140 includes a plurality of first feeding chambers/slots 142 defining eating spaces in the first feeding pan 146. The first feeding chambers/slots 142 are separated from each other via walls 147 of the first pan assemblies 150. Thus, the first feeding chambers/slots 142, more specifically, the eating spaces are secluded from each other. The first feeding chambers/slots 142 are configured to store feed therein. The first feeding chambers/slots 142 are configured circumferentially on each of the first feeding pan 146. The advantage of providing secluded first feeding chambers/slots 142 is that a bird cannot easily access the feed of a neighboring bird, unless the neighboring bird moves out. Further, the walls 147 of the first pan assemblies 150 prevent mixing of feed from neighboring first feeding chambers/slots 142. Based on the total number of birds on the floor and their sex, the first feeding chambers/slots 142 are filled with adequate amount of feed. The number of first feeding chambers/slots 142 is varied as per application requirement.

The number of first feeding chambers/slots 142 to be filled with the feed and amount of feed to be filled depend upon number of birds and/or their sex. For example, in a building, if there are total 630 pans with 16 first feeding chambers/slots 142 each, mean there are total 10080 first feeding chambers/slots 142 available. Thus, maximum 10080 birds can eat at a time. For any reason, if number of birds is reduced, then only that number of first feeding chambers/slots 142 will be programed to be refilled with exact quantity of feed and also ensuring that the feeding space available is equal to the number of birds in the building (or on the floor).

Typically, the first pan assemblies 140 are used to feed male birds and have secluded first feeding chambers/slots 142 to provide each male bird its own feeding space, whereas a plurality of second pan assemblies 150 is used to feed female birds. Each pan of the second pan assemblies 150 also have secluded second feeding chambers/slots 152 that provide each female bird its own feeding space.

For feeding only male birds, the second pan assemblies 150 are connected to a conveyor 110. In accordance with an embodiment, after filling the feed in the second pan assemblies 150, the height of a portion of the conveyor 110 is adjusted such that only male bird can eat through it.

In an embodiment, the IFH-station 240 of the system is configured to dispense an exact amount and type of feed into the respective first and second pan assemblies (140 and 150).

The other components of the system as disclosed in the Indian patent application number 201821037601 filed on Oct. 4, 2018 cooperate with the pan assembly 150 in similar fashion as that with the pan assembly disclosed in the Indian patent application number 201821037601.

FIG. 3 to FIG. 6 illustrate various configurations of the feeding system disclosed in the present disclosure and in the Indian patent application number 201821037601 filed on Oct. 4, 2018.

In accordance with an embodiment, the feeding system comprises both first and second pan assemblies (140 and 150) attached to the conveyor 110. In this system, the configuration of the first and second pan assemblies and their positions are interchangeable. Hence, it is possible to place all first pan assemblies on one side of the conveyor circuit with required height difference and thus enabling two distinct feeding areas around the same conveyor circuit. Male and female birds have two distinguished differences. Male birds are taller than female birds and male birds have remarkably large comb and wattles. Both these characteristics are considered in designing the present feeding system to ensure that male and female birds are fed separately formulated feed for better livability and productivity.

With the implementation of the present feeding system, the male and female birds will not be able to eat each other's ration/feed. The heights of the conveyor can be adjusted to a required difference so that a female bird cannot accesses ration/feed of male birds.

Figure 4:
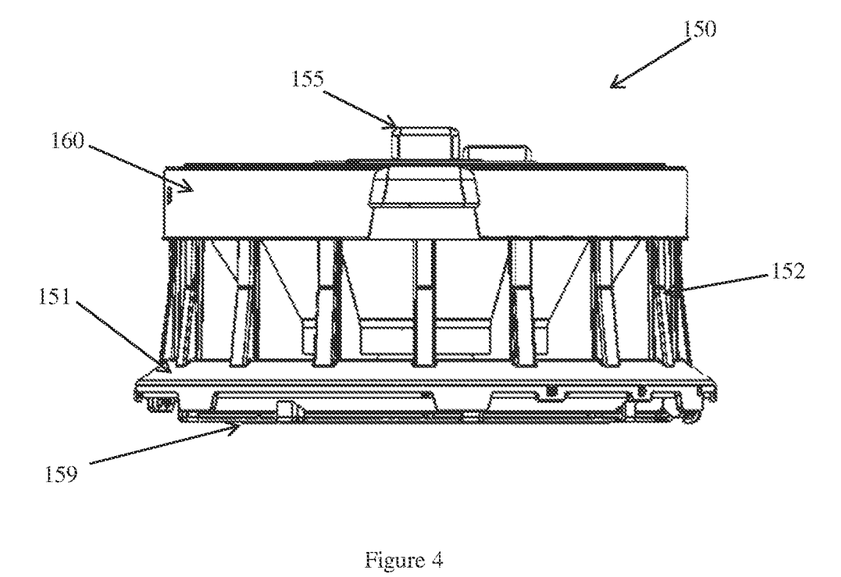
FIG. 4 shows a front view of a second pan assembly.

FIG. 4 shows the second pan assembly 150 for feeding female birds. The second pan assembly 150 has secluded second feeding chambers/slots 152 in accordance with an embodiment of the present disclosure. Each of the second pan assemblies 150 is provided with a grill structure 163. The grill structure 163 is configured to increase or decrease the width and height the opening of each of the second feeding chambers/slots 152. The male birds will not be able to access the female feed from the openings of the grill structure 163 of the second pan assemblies 150 due to their large comb and wattles. Height adjustment of the openings in the second pan assemblies 150 is done by placing and locking a height adjustment-ring 160 in four different positions and similarly widthwise adjustment is done by placing and locking the grill structure 163 in four different positions. Similarly to the first anti-spillage cum neck-comfort ring 141, a second anti spillage cum neck-comfort ring 151 is provided in each of the second pan assemblies 150.

A second protector grill structure is provided with anti spillage cum neck-comfort ring to each second (female) pan.

Figure 5A:
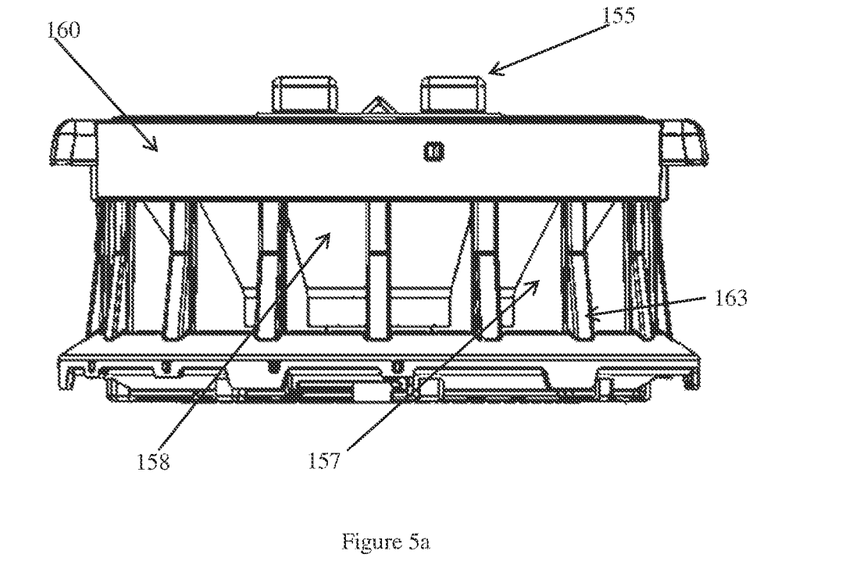
FIG. 5a shows a side view of a second pan assembly of FIG. 4.
Figure 5B:
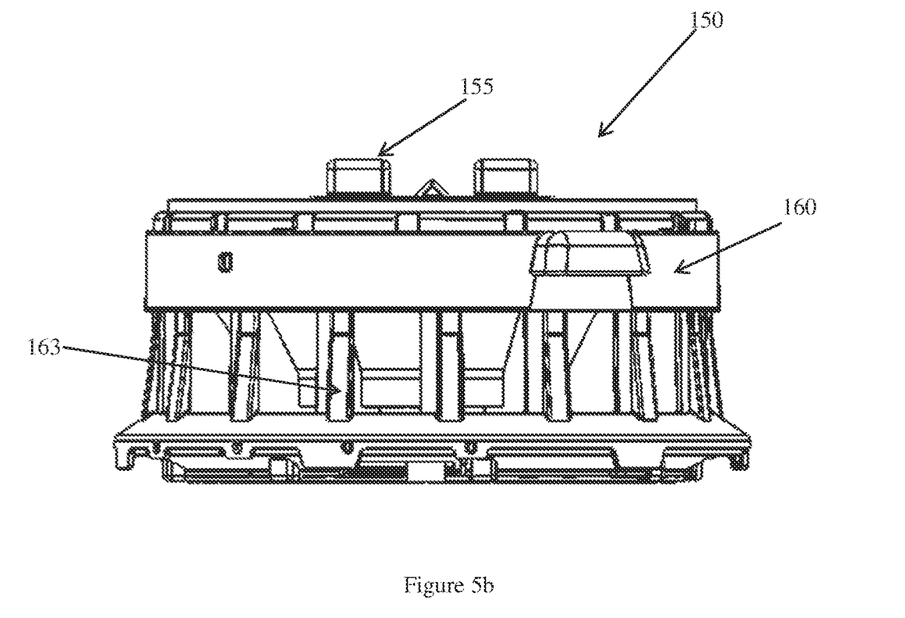
FIG. 5b shows a side view of a second pan assembly, wherein the height of the opening to feeding chamber is reduced.

FIGS. 5*a* and 5*b* show the side views of the second pan assembly 150 of FIG. 1 at different height settings of the opening. The height adjustment-ring 160 in FIG. 5*b* can be seen at a relatively lower height as compared to FIG. 5*a*. The numbers of height and width settings will depend on the size of the second pan assembly 150 and the number of birds being fed therein.

Figure 6A:
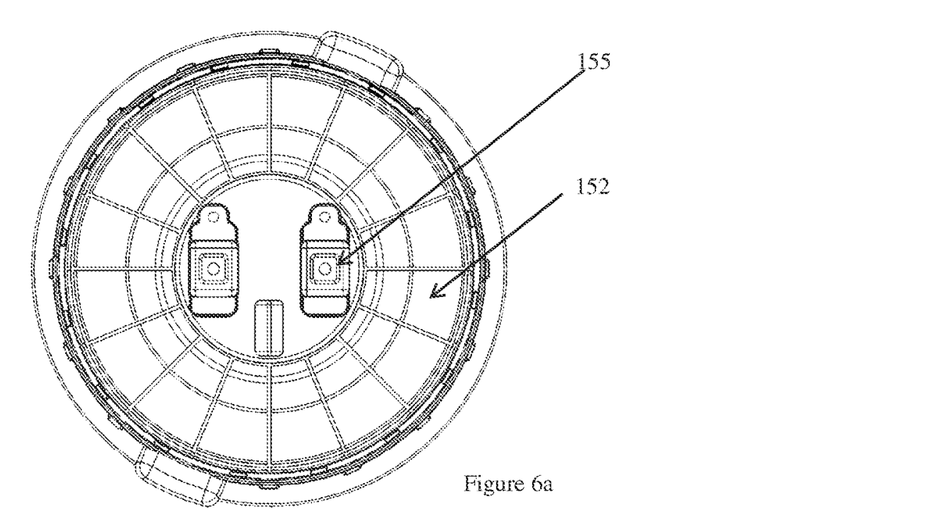
FIG. 6a shows a top view of the second pan assembly of FIG. 4.
Figure 6B:
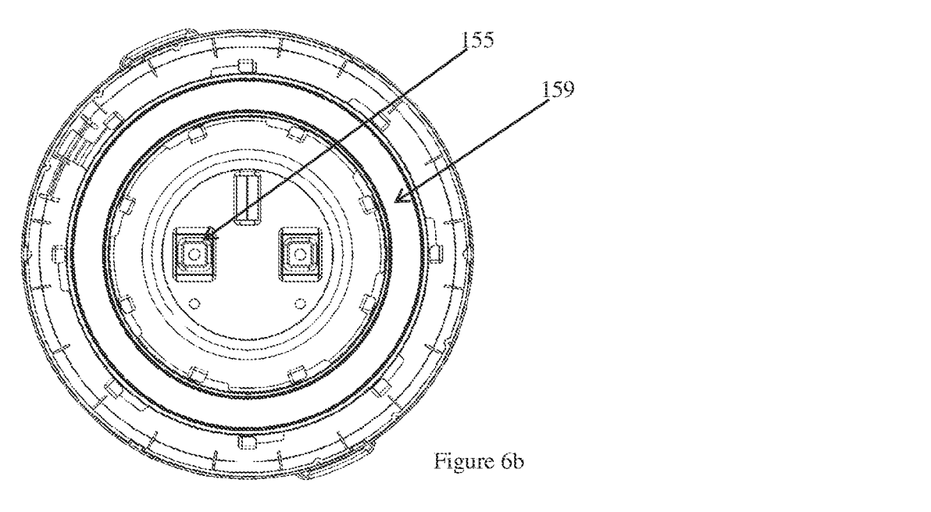
FIG. 6b shows a bottom view of the second pan assembly of FIG. 4.

FIG. 6*a* shows a top view of the second pan assembly 150 of FIG. 4. FIG. 6*b* shows a bottom view of the second pan assembly 150 of FIG. 4.

The openings in the second pan assemblies 150 can be done from any one position of the building as the second pan assemblies 150 move along the conveyor 110 and each second pan assembly 150 can be brought to one location for readjustment. Similarly, each of the second pan assembly 150 can be brought to one location for emptying left over feed if any. This also enables cleaning, washing and disinfection of the pan assemblies at a single location. Further, this feature also enables the possibility of adopting auto washing system.

Drains are provided in both the first 140 and the second pan assemblies 150. The drain/s in each of the first 140 and second pan assemblies 150 is covered by first bottom rings 149 and second bottom ring 159, respectively.

A plurality of walls 157 is provided in the second pan assemblies 150 for secluding the feeding space for each female bird.

Figure 7:
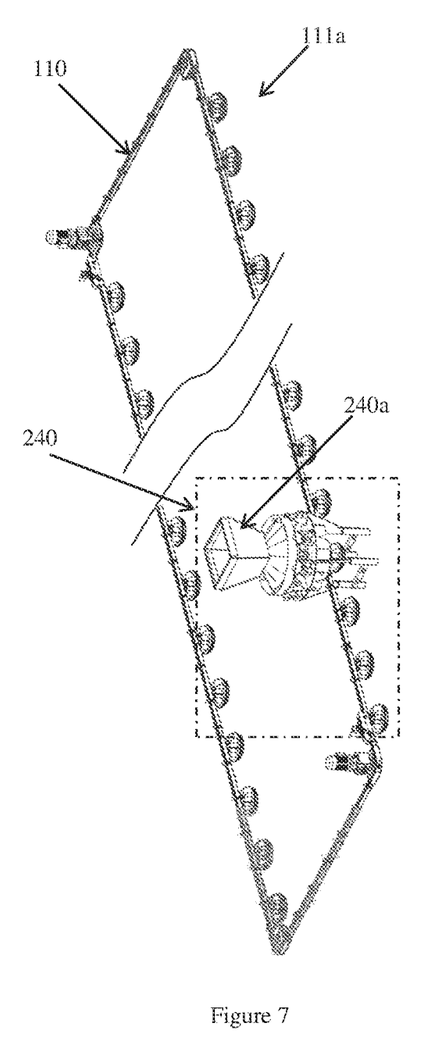
FIG. 7 shows a schematic diagram of a first feeding circuit 111a, in accordance with an embodiment of the disclosure.

A first feeding circuit 111*a* shown in FIG. 7 includes only first pan assemblies 140 along with a first IFH 240*a*.

Figure 8:
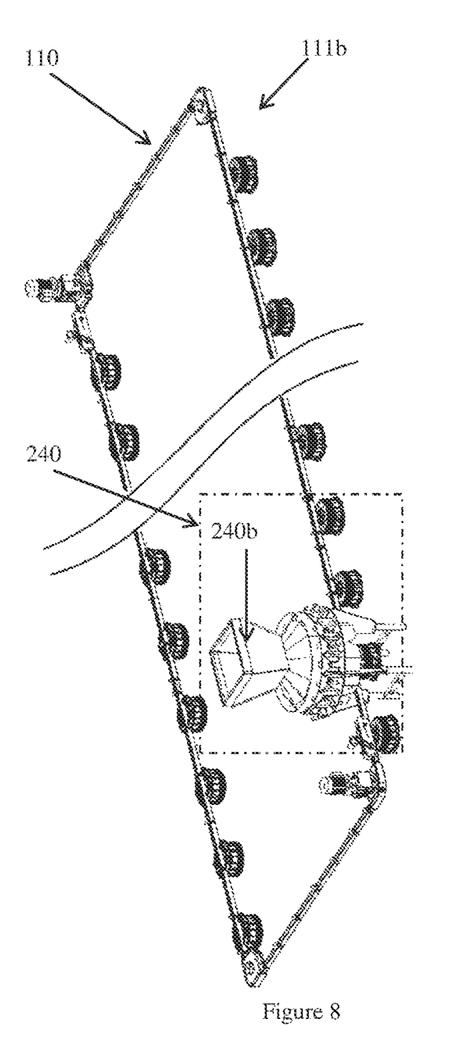
FIG. 8 shows a schematic diagram of a second feeding circuit 111b, in accordance with another embodiment of the disclosure.

A second feeding circuit 111*b* shown in FIG. 8 includes only second pan assemblies 150 along with a second IFH 240*b*.

Figure 9:
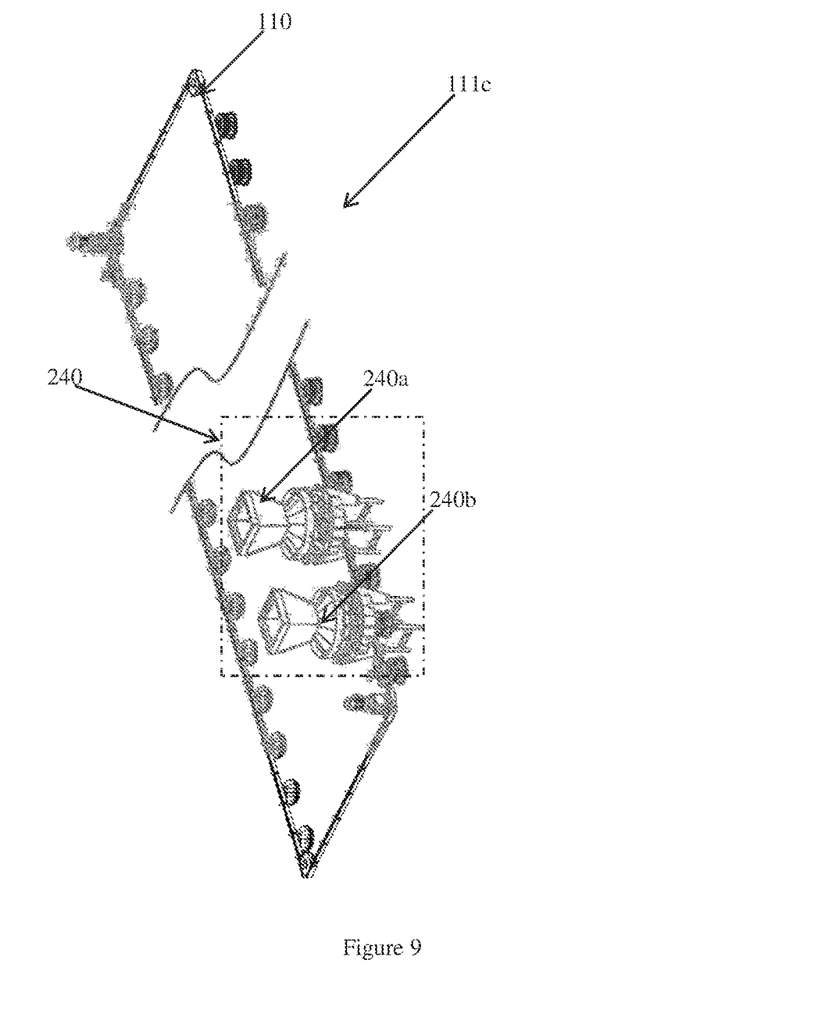
FIG. 9 shows a schematic diagram of a third feeding circuit 111c, in accordance with yet another embodiment of the disclosure.
Figure 10:
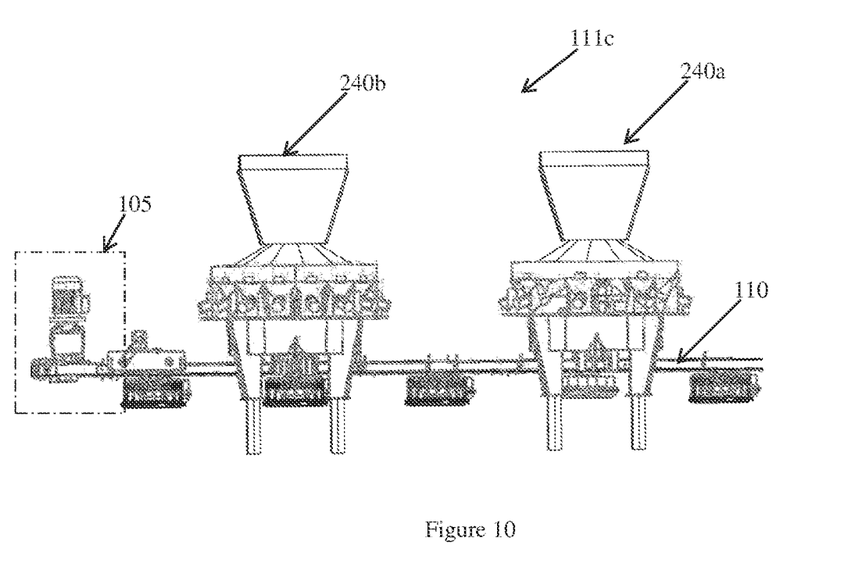
FIG. 10 shows a side view of the third feeding circuit 111c of FIG. 9.

A third feeding circuit 111*c* shown in FIG. 9 includes both first pan assemblies 140 and second pan assemblies 150 along with the first IFH 240*a* and the second IFH 240*b*.

Figure 11:
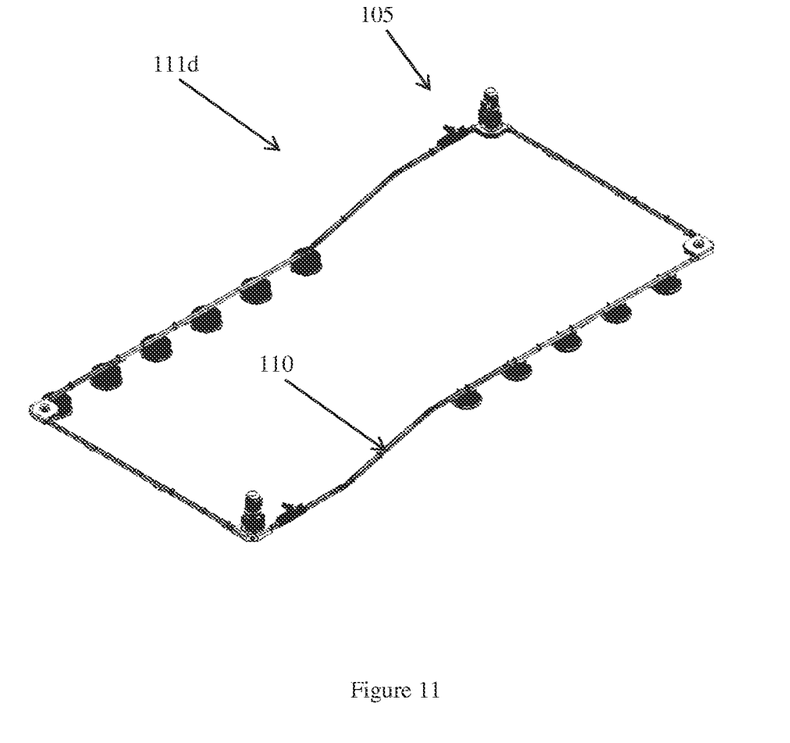
FIG. 11 shows a schematic diagram of the fourth feeding circuit 111d.

A fourth feeding circuit 111*d* shown in FIG. 11 has the first pan assemblies 140 on one side with raised conveyor height as well as the second pan assemblies 150 on the lowered portion of the conveyor 110.

In an embodiment, the material of the first 141 and the second anti spillage cum neck-comfort ring 151 is selected from the group of materials consisting of plastic and steel.

The advantage of the system of the present disclosure is that male birds do not need to rush to one side of a floor as the same conveyor has male as well as first pan assemblies.

A throat piece 158 is provided in each of the second pan assemblies 150. The throat piece 158 acts as a supply of feed in each of the second pan assemblies 150.

It should be noted that the circuit 1, 2, 3 and 4 are only for exemplary purposes, and do not limit the scope of the present disclosure. Any other arrangement and number of the first pan assemblies 140 and the second pan assemblies 150 is well within the scope and ambit of the present disclosure.

In another embodiment, only first pan assemblies 140 or only second pan assemblies 150 are connected to the conveyor 110.

Technical Advancements

The present disclosure described herein above has several technical advantages including, but not limited to, the realization of a feeding system that:

facilitates controlled food distribution;

facilitates precise food distribution;

facilitates control over feeding space and at required location;

facilitates mounting of both first and second pan assemblies on the same conveyor and at desired locations;

prevents overfeeding; and prevents mixing of food of a male bird and a female bird.

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A feeding system for poultry, said feeding system comprising:
   a conveyor routed along a floor;
   a plurality of first pan assemblies, each of said first pan assemblies having a plurality of walls and being removably secured to said conveyor wherein each of said first pan assemblies being separated by said walls from each other into a plurality of secluded feeding chambers;
   a plurality of second pan assemblies, each of said second pan assemblies having a plurality of walls and being removably secured to said conveyor wherein each of said second pan assemblies being separated by said walls from each other into a plurality of secluded feeding chambers;
   a drive arrangement for driving the conveyor, said drive arrangement having at least one main drive unit comprising a combination of prime mover and push belt drive coupled to said conveyor, said main drive unit configured to power said conveyor; and
   an intelligent feed hopper station (IFH-station), said intelligent feed hopper station (IFH-station) comprises a plurality of chutes and is configured to fill a necessary number of secluded feeding chambers of said pan assemblies with an exact quantity of feed according to reduced number of birds, when each of said pan assemblies moves through said IFH-station,
   wherein, said plurality of chutes correspond to the number of feeding chambers in said pan assemblies, and wherein when at least one of said pans are fed with feed, at least one of said plurality chutes is positioned adjacent to at least one feeding chamber of at least one of said pans;
   wherein, said IFH-station is configured and programmed to dispense feed to the total number of required secluded feeding chambers and their locations according to age, sex, performance, quantity of feed per bird, and number of birds available after deducting daily mortality, wherein if the number of birds declines, a fewer number of chambers are refilled with feed from their respective chutes, while simultaneously remaining chambers receive individually calculated feeds from their respective chutes.

2. The feeding system for poultry as claimed in claim 1, wherein a height adjustment-ring is provided in said second pan assemblies, said height adjustment-ring is configured to vary the height and width of the opening of a plurality of second feeding chambers of each pan of said second pan assemblies.

3. The feeding system for poultry as claimed in claim 1, wherein the first pan assemblies are configured to feed male birds while second pan assemblies are configured to feed female birds.

4. The feeding system for poultry as claimed in claim 1, wherein a grill structure is provided in each pan of said second pan assemblies made with the possibility of increasing or decreasing the width and the height of the opening of each of the plurality of the second feeding chambers.

5. The feeding system for poultry as claimed in claim 1, wherein said IFH-station comprises:
   a first intelligent feed hopper (first IFH), said first IFH configured to supply feed into each of said first pan assemblies; and
   a second first intelligent feed hopper (second IFH), said second IFH configured to supply feed into each of said second pan assemblies.

6. The feeding system for poultry as claimed in claim 1, wherein the system includes a first anti spillage cum neck-comfort ring in each pan of said first pan assemblies to avoid feed spillage by male birds during eating, and a second anti spillage cum neck-comfort ring in each pan of said second pan assemblies to avoid feed spillage by female birds during eating.

7. The feeding system for poultry as claimed in claim 6, wherein said first anti-spillage cum neck-ring and said second anti-spillage cum neck-ring is configured to avoid feed spillage during refilling of the pan assemblies at the IFH-station.

8. The feeding system for poultry as claimed in claim 1, wherein a plurality of hooks is used to attach said pan assemblies to said conveyor.

9. The feeding system for poultry as claimed in claim 1, wherein said second pan assemblies are configured operatively higher than said first pan assemblies, said conveyor is configured to move said pan assemblies simultaneously through said IFH station.

10. The feeding system for poultry as claimed in claim 1, wherein the main drive consists of a combination of prime mover and belt drive.

11. The feeding system as in claim 1, wherein said plurality of chutes comprise a plurality of chutes spaced radially around a periphery of the intelligent feed hopper station.

12. The feeding system as in claim 1, wherein said plurality of chutes each comprise walls that extend down to each of the pan assemblies when the pan assemblies are being fed.

13. The feeding system as in claim 1, further comprising a plurality of direct connections between each of the chutes to each of the secluded feeding chambers.

* * * * *